United States Patent [19]
Lindstrom et al.

[11] 3,980,871
[45] Sept. 14, 1976

[54] DEVICE FOR REGISTERING AND INDICATING THE SIZE OF A LOAD ACTING ON A TRANSDUCER

[76] Inventors: Roland Lindström, Morogatan 30, Skelleftea; Kjell Lidström, Norra Kustvagen 13, Burea, both of Sweden

[22] Filed: Feb. 4, 1975

[21] Appl. No.: 546,963

[30] Foreign Application Priority Data
Feb. 4, 1974 Sweden .............................. 7401401

[52] U.S. Cl. .................... 235/151.33; 235/92 WT; 177/25
[51] Int. Cl.² .................. G01G 19/00; G06F 15/20
[58] Field of Search ...... 235/151.33, 151.3, 92 WT, 235/92 MT; 177/25

[56] References Cited
UNITED STATES PATENTS

| | | | |
|---|---|---|---|
| 3,063,635 | 11/1962 | Gordon | 235/151.33 |
| 3,665,169 | 5/1972 | Henderson et al. | 235/151.33 X |
| 3,674,097 | 7/1972 | Gile | 235/151.33 X |
| 3,684,875 | 8/1972 | Smith et al. | 235/151.33 |
| 3,819,922 | 6/1974 | Horn et al. | 235/151.33 X |
| 3,826,321 | 7/1974 | Rigney et al. | 235/151.33 X |

*Primary Examiner*—Edward J. Wise
*Attorney, Agent, or Firm*—Sughrue, Rothwell, Mion, Zinn and Macpeak

[57] ABSTRACT

A load size registering and displaying device is disclosed which can operate either statically or dynamically. The device is manually or automatically operable to account for tare weight. The load weight can be accumulated through a series of partial weighings, and the total load weight can be registered as a distribution of several partial loads.

9 Claims, 3 Drawing Figures

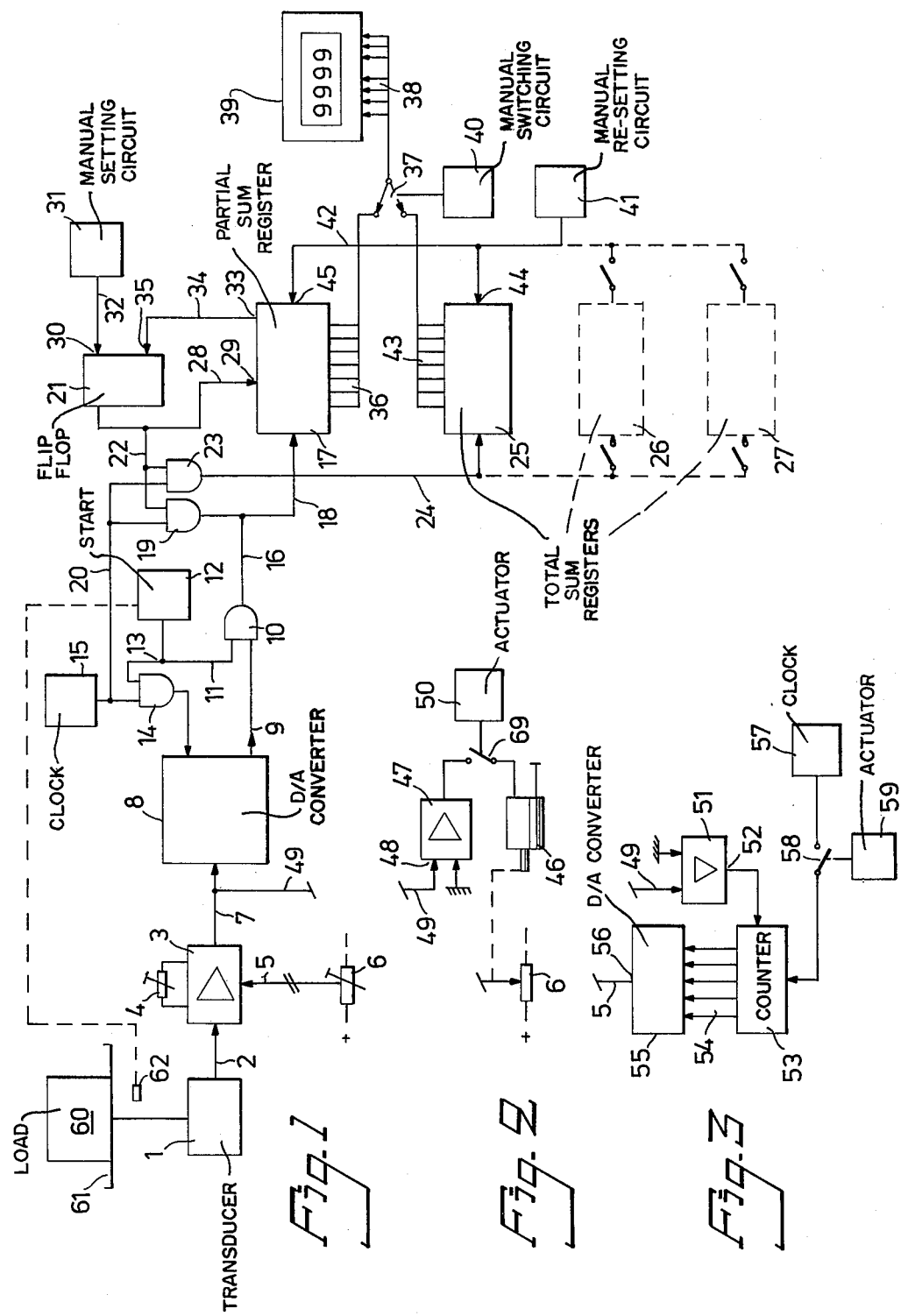

DEVICE FOR REGISTERING AND INDICATING THE SIZE OF A LOAD ACTING ON A TRANSDUCER

BACKGROUND OF THE INVENTION

The invention relates to a device for registering and displaying the size of a load acting on a load-indicator or transducer, the transducer being arranged to send an analogue voltage signal corresponding to the load to an analogue/digital converter, the digital output signal of which is applied to a numerical display device.

Such devices are used for example to indicate the load carried by a lifting boom, a weighing platform, a truck bed or the like. Common to all the known devices is that an addition of different partial loads cannot be achieved with surety, or with simple means, in particular when weighing is done dynamically, i.e. when the load is moving.

SUMMARY OF THE INVENTION

The chief object of the invention is to provide a simple and reliable device which is suitable for both static and dynamic weighing and this object is completely realized by the device defined in the claims.

BRIEF DESCRIPTION OF THE DRAWING

An embodiment is described while referring to the attached drawing, in which

FIG. 1 shows a simplified diagram of the device,

FIG. 2 shows a special embodiment of a tare taking or taring circuit and

FIG. 3 shows another embodiment of the taring circuit.

DESCRIPTION OF THE PREFERRED EMBODIMENTS

FIG. 1 illustrates in a simplified manner an embodiment of the invention. The whole device includes a transducer 1, of any suitable kind whatsoever, e.g. a strain transducer, a magnetostrictive transducer, a hydraulic/electric transducer or the like. The transducer 1 is arranged to carry a load 60 on a weighing platform 61 or the like, to be attached to an arm to be attached under the loading deck on a goods vehicle or the like. The transducer 1 sends an electrical signal proportional to the load over a wire 2 to the one input on a differential amplifier 3. In the embodiment shown, a potentiometer 4 lies across the differential amplifier for adjusting the amplifying factor of the amplifier. A wire 5 from a taring potentiometer 6 is applied to the other input of the differential amplifier. The purpose of the taring potentiometer 6 is to compensate the portion of the input signal over wire 2 which constitutes the tare itself, e.g. the weight of the empty loading deck or the weight of an empty excavating bucket. The potentiometer 6 is connected to a setting wheel, not shown here, by which the output signal from the differential amplifier on the wire 7 is adjusted to zero. The output signal over wire 7 is fed to an analogue/digital converter 8. The output of the analogue/digital converter is connected by wire 9 to the one input of an AND gate 10. To start the measuring function, which will be described later, a starting circuit 12 is connected to the second input of the AND gate 10. Output 12 of the starting circuit is connected by a wire 13 to the one input of an AND gate 14, the second input of which is connected to a clock pulse source 15. The output of the AND gate 14 is connected to the analogue/digital converter 8. By means of a wire 16 the output of the AND gate 10 is connected to the input of a partial sum register 17 over a wire 18. To the input of the partial sum register 17 is further connected the output of an AND gate 19, the one input of which is connected by a wire 20 to the clock pulse source 15, the other input being coupled to a flip-flop or bistable multivibrator circuit 21 by a wire 22. The clock pulse source 15 is further connected by the wire 20 to the one input of an AND gate 23, the other input of which is connected to the wire 22 and thereby to the output from the bistable multivibrator circuit 21. The output of the AND gate 23 is connected by a wire 24 to a total sum register 25. The total sum register may be, for example, a binary counter, which counts pulses passed by AND gate 23, and a binary-to-decimal converter, which provides a decimal output to the numerical display 39 via switch 37. As may be seen from FIG. 1, further total sum registers, e.g. the total sum registers 26 and 27 indicated by dotted lines, can be individually connectable for reasons which will be explained later. The output of the bistable multivibrator circuit 21 is further connected by a wire 28 to a control input 29 on the partial sum register 17. The partial sum register may be, for example, a forward/backward binary counter, which counts pulses passed by AND gates 10 and 19 in a forward direction or a backward direction, respectively, under the control of a signal at input 29, and a binary-to-decimal converter, which provides a decimal output to the numerical display 39 via switch 37. To one input 30 of the bistable multivibrator circuit is connected a manually operable circuit 31, arranged to give a signal on actuation via the wire 32 to cause the addition of the value on the partial sum register to the chosen total sum register, e.g. the register 25. An output 33 from the partial sum register 17 is connected by a wire 34 to a re-setting input 35 on the bistable multivibrator circuit 21. The partial sum register has a number of numerical outputs 36 which, over a switch 37 shown schematically in FIG. 1, are connected to corresponding numerical inputs 38 on a numerical display 39. The switch 37 is setable from the position shown, signifying direct transfer of numerical values from the partial sum register 17 to the numerical display 39, by means of a manually operable total sum switching circuit 40. A manually operable re-setting circuit 41 is connected to the partial sum register and the respective total sum register, said circuit 41 being arranged to give a re-setting signal to the respective register on actuation via a wire 42.

The function of the device described according to FIG. 1 is as follows:

It is assumed that the transducer is connected to a load platform or load supporting structure and sends a signal corresponding to the weight of the load supporting structure over a wire 2 to the differential amplifier 3. The measuring function is started by manual operation of the starting circuit 12, thereby opening the gate circuit 14 and the gate circuit 10. The load or weight signal goes over the wire 2 to the differential amplifier 3 and from this via the wire 7 to the analogue/digital converter 8, which in response to the clock pulses from the clock pulse source 15 going through the AND gate 14 generates a pulse train on the output 9, e.g. 1 pulse per 10 kg load. This pulse train is fed to the partial sum register 17 via the open AND gate 10 and the wires 16 and 18. The partial sum register 17 is in a forward counting state since the bistable multivibrator circuit 21 was put in the set state on starting the system, the set state being that in which a signal is sent via the wire 28 to the partial sum register 17 controlling the partial sum register to count from zero upwards in a forward direction on reception of pulses over the wire 18. The pulses fed into the partial sum register 17 are stored in the partial sum register and the stored signals are converted to decimal form and transferred via the numerical outputs 36 to the numerical inputs 38 and are given in decimal form on the display 39. It should be noted that the measuring sequence is extremely rapid and that four pulse trains for example, each giving the weight of the load supporting structure, are generated every second and fed into the partial sum register. At each new input, the register is automatically emptied, and only one transfer can thus take place to the display 39. The loading value given on the display 39 corresponds to the tare weight of the weighing apparatus itself, and must be zeroed, which is done by means of the potentiometer 6 in the embodiment shown in FIG. 1, the potentiometer then feeding a taring signal via the wire 5 into the differential amplifier. The potentiometer 6 is adjusted by a wheel not shown here, so that the output signal from the analogue/digital converter is zero, i.e. no pulse train is sent over the wire 9, the display 39 thereby showing zero.

The load supporting means can now be supplied with the load which is to be weighed and the load indicator 1 sends a signal over wire 2, corresponding to the load and tare weight. The differential amplifier and therewith the analogue/digital converter send on the other hand an output signal which is proportional only to the load, and this load signal is registered in the manner described above by the display 39. It is assumed that the load and measurement are static, but as will be later described, the device is arranged to enable the performance of correct weighing when the load is in movement. It is further assumed that the loading operation which is carried out includes a plurality of partial loads and that the total weight of these partial loads is to be registered by the total sum register. After the first partial load is weighed and set up in the partial sum register 17 and shown on the display 39, the circuit 31 is actuated manually, whereat a signal is given to the re-set input 30 of the bistable multivibrator circuit 21, and the bistable multivibrator circuit is thereby re-set and sends a signal via the wire 28 to the partial sum register 17, saying that during a subsequent operational cycle the latter shall count backward from the value registered in the register to zero. Via a wire 22 the bistable multivibrator circuit 21 simultaneously sends a signal to the AND gate 23 and to the AND gate 19. The second inputs of both these AND gates receive signals from the continuously working clock pulse source 15. The AND gates 10 and 14 have previously been closed by the absence of a signal from the starting circuit 12. The clock pulse signals are thus fed on the one hand to the AND gate 19 of the partial sum register 17 which is controlled to count backward, and on the other hand through the AND gate 23 to the total sum register. The partial sum register 17 thus begins to count to zero in time with the incoming clock pulses in response to the received clock pulse signals, the clock pulses being simultaneously fed to the total sum register 25. When the partial sum register has counted down to zero, a resetting or stop signal is sent via the wire 34 to the bistable multivibrator circuit 21, interrupting the signal on the wire 22, the circuits 19 and 23 thereby being closed, and clock pulses are no longer fed to the register 25. The pulses now stored in the total sum register correspond in number to the pulses stored in the partial sum register memory earlier. The circuit 31 has been manually or automatically re-set to the inactive state and thus does not send any signal to the bistable multivibrator circuit 21. The device is now ready for a further partial load weighing and the described sequence is repeated. After a desired number of partial loads have been registered in the total sum register 25, the manually controlled circuit 40 is operated and the switch 37 is set to the position shown by dotted lines in FIG. 1, whereafter the content of the register 25 sent over the numerical outputs 43 to the display 39 via the switch 37. It should be noted that in the embodiment shown, the value remains in the total sum register, and further partial loads can be added and thereafter displayed on the display 39. When the resetting circuit 41 has been manually operated, a re-setting signal sent to the re-setting input 44 of the register 25 and to the re-setting input 45 of the partial sum register 17. As has been mentioned above, weighing has been assumed to take place statically, but dynamic weighing can also be carried out.

With dynamic weighing, a state scanner is arranged, e.g. a limit switch or a optical scanning device 62 on the load supporting structure itself, e.g. a loading deck, a boom, an excavation bucket or the like, and a signal is generated when the load supporting structure passes within a certain area during its travel. This signal triggers the previously manually operated starting circuit 12 so that a signal is sent to the gates AND 14 and 10 to open these. Possible disturbances in the signal from the indicator 1 must be integrated in the differential amplifier 3.

In FIG. 2 there is shown an alternative embodiment for automatic taring or zeroing of the output signal from the differential amplifier. The potentiometer 6 shown in FIG. 1 is controlled according to FIG. 2 by a servomotor 46, which in its turn is controlled by an amplifier 47, the one input 48 of which senses the error signal on the wire 49, which is connected to the output of the differential amplifier 3. The taring circuit shown in FIG. 2 is started by closing an automatically re-setting closing contact 69, which is controlled by an actuator 50.

In the taring device according to FIG. 1 as well as according to FIG. 2, the set taring signal will remain until a new setting has been made, irrespective of whether the voltage to the whole system is on or off.

In FIG. 3 an alternative embodiment is shown, in which taring is made each time the system is started by applying voltage. In this embodiment a comparator 51 is connected to the wire 49 and arranged to sense the tare weight signal from the differential amplifier, and on its output 52 generate a positive or negative error signal for a counter 53, which in response to the sign of the error signal counts upwards or downwards and sends a digital signal on the numerical outputs 54 to a digital/analogue converter 55, the output 56 of which is directly coupled to the input of the differential amplifier 3 via the wire 5, excluding the potentiometer 6. The counter 53 is controlled via a clock pulse source 57, which is coupled in during taring to the counter 53 over a normally open contact 58 which is controlled from an actuator 59. After taring has taken place and the contact 58 is opened, the counter 53 remains in a set position, and a continuous signal is sent via the wire 49 until a sequential taring takes place by depressing the actuator 59. Taring must thus be redone each time voltage to the system has been broken and is coupled anew.

The further total sum registers 26, 27 are arranged, for example, to enable the distribution of the weighed partial loads into different groups, each of which corresponds to a delivery to a certain customer. After weighing of a delivery has been completed and registered in the register 25, this register is coupled out while retaining the registered sum, and by using selector means the register 26 is coupled instead to clock pulse source 15, and so forth.

The invention can be modified in different ways within the scope of the patent claims. It is thus possible, for example, to exclude the taring means 6, and set the amplifier 3 on a zero output signal when load 60 is nonexistant, on condition that otherwise unaltered values can be relied on to affect the amplifier. It is understood that the described display means 39 can constitute a printer for printing-out of loads, e.g. the partial loads and the total load.

We claim:
1. A device for registering and indicating the size of a load, comprising:
   a transducer on which the load acts, said transducer generating an analogue voltage signal corresponding to the load,
   an analogue/digital converter connected to receive said analogue voltage signal, said analogue/digital converter producing a digital output proportional to the amplitude of said analogue voltage signal,
   a partial sum register,
   at least one total sum register,
   control means for first connecting the digital output of said analogue/digital converter to said partial sum register to store the digital output representing the size of the load prevailing at the moment and thereafter transferring the content of said partial sum register to said total sum register, said total sum register being operable to accumulate a plurality of transfers from said partial sum register,
   a numerical indicating device, and
   selector means for selectably connecting the output of said partial sum register or the output of said total sum register to said numerical indicating device.

2. A device as recited in claim 1 wherein the digital output of said analogue/digital converter is a pulse output comprising a number of pulses proportional to the amplitude of said analogue voltage signal, said partial sum register is controllably operable to count pulses in a forward direction or a backward direction, and said at least one total sum register is operable to count pulses in a forward direction, said control means comprising:
   a bistable multivibrator having set and re-set states, said bistable multivibrator when in its re-set state produces a control signal to cause said partial sum register to count in said forward direction and when in its set state produces a control signal to cause said partial sum register to count in said backward direction,
   start means for connecting the pulse output of said analogue/digital converter to said partial sum register which counts said pulse output in a forward direction,
   a source of clock pulses,
   manually operable means for setting said bistable multivibrator,
   gate means connected to said source of clock pulses and controlled by said bistable multivibrator when in its set state to pass clock pulses to both said partial sum register and said at least one total sum register, said partial sum register counting in a backward direction and said at least one total sum register counting in a forward direction in synchronism, said partial sum register generating a re-set signal to said bistable multivibrator when said partial sum register reaches a count of zero.

3. A device as recited in claim 2 wherein said start means comprises:
   a gate circuit connected between said analogue/digital circuit and said partial sum register, and
   a start circuit connected to enable said gate circuit to pass the pulse output from said analogue/digital converter and thereafter block said output.

4. A device as recited in claim 3 wherein said start circuit is manually operable.

5. A device as recited in claim 3 further comprising a load support and wherein said start circuit includes sensing means for sensing when said load support is within a certain area and enabling said gate circuit.

6. A device as recited in claim 1 further comprising:
   a differential amplifier having two inputs and one output connected between said transducer and said analogue/digital converter, one input of said differential amplifier being connected to receive said analogue voltage signal and the output of said differential amplifier being connected to said analogue/digital converter, and
   circuit means connected to the other input of said differential amplifier for providing a signal proportional to the tare weight which signal is subtracted from said analogue voltage signal by said differential amplifier.

7. A device as recited in claim 6 wherein said circuit means is a manually adjustable potentiometer.

8. A device as recited in claim 6 wherein said circuit means comprises:
   a potentiometer which generates said signal proportional to the tare weight, and
   servo means interruptably connected to the output of said differential amplifier for adjusting said potentiometer.

9. A device as recited in claim 6 wherein said circuit means comprises:
   a source of clock pulses,
   a counter interruptably connected to said source of clock pulses for counting said clock pulses,
   a digital/analogue converter connected to said counter to produce an analogue signal output to said differential amplifier which is proportional to the count accumulated in said counter, and
   comparator means connected to the output of said differential amplifier for controlling the operation of said counter.

* * * * *